United States Patent [19]

Schremmer et al.

[11] Patent Number: 5,358,353
[45] Date of Patent: Oct. 25, 1994

[54] DEVICE AND METHOD FOR THE EQUIAXIAL CONNECTION OF MULTIPLE-PART LINKAGES

[75] Inventors: Gottfried Schremmer, Tamm; Wolfgang Jörg, Stuttgart, both of Fed. Rep. of Germany

[73] Assignee: Mercedes-Benz AG, Fed. Rep. of Germany

[21] Appl. No.: 25,650

[22] Filed: Mar. 3, 1993

[30] Foreign Application Priority Data

Mar. 17, 1992 [DE] Fed. Rep. of Germany ....... 4208497

[51] Int. Cl.⁵ ............................ F16B 1/00; B62D 1/16
[52] U.S. Cl. ...................................... 403/196; 403/195; 74/492
[58] Field of Search ........................ 280/775, 777, 778; 74/492; 403/195, 196, 292; 180/78

[56] References Cited

U.S. PATENT DOCUMENTS

| | | | |
|---|---|---|---|
| 3,457,800 | 7/1969 | Toshida et al. | 280/777 |
| 4,072,028 | 2/1978 | Connell | 64/24 |
| 5,002,422 | 3/1991 | Schremmer et al. | 403/359 |

FOREIGN PATENT DOCUMENTS

| | | |
|---|---|---|
| 1087472 | 2/1961 | Fed. Rep. of Germany . |
| 3433635 | 3/1986 | Fed. Rep. of Germany ........ 74/492 |
| 3712195 | 4/1987 | Fed. Rep. of Germany . |
| 246654 | 2/1926 | United Kingdom . |
| 1510892 | 5/1978 | United Kingdom . |

*Primary Examiner*—Karin L. Tyson
*Assistant Examiner*—Paul N. Dickson
*Attorney, Agent, or Firm*—Evenson, McKeown, Edwards & Lenahan

[57] ABSTRACT

A device and method for the equiaxial connection of multiple-part linkages includes a bush whose inside contour has a serration and whose outside contour is constructed as a dihedral profile. A flange of a coupling is slipped over the bush which has been fitted onto an end of a rod, this rod end being provided with a surface toothing. The inside contour of the flange has a dihedral profile corresponding to the bush. The device allows automated connection of steering linkages in vehicle assembly.

7 Claims, 1 Drawing Sheet

DEVICE AND METHOD FOR THE EQUIAXIAL CONNECTION OF MULTIPLE-PART LINKAGES

BACKGROUND AND SUMMARY OF THE INVENTION

The invention relates to a device for the equiaxial connection of multiple-part linkages such as steering linkages of vehicles, with precise setting of the rotational position. The device includes a coupling, mounted between rods, with two flanges that firmly surround one end of a rod respectively. The end of at least one rod has an even, fine surface toothing.

Devices of this type are known, in particular, from motor vehicle constructions for connecting steering linkages. In the simplest case, the ends of the two rods to be connected to one another have a notching or toothing. With the toothing, the rods facing one another with their ends engage in and are firmly connected to one another in this position, for example with the aid of a clamping sleeve (see for example, German Patent Specification 1,087,472). A further possibility of connecting two rods to one another axially and, in doing so, of setting the rotational position includes providing a coupling piece having two hubs, the inside contour of the first hub being constructed as a toothing. With this first hub, the coupling piece is fixed on the toothed end of the first rod while it grips around the second rod with the second hub so as to be fixed against rotation.

German Patent Specification 3,712,195 shows the connection of a hub to a shaft via a bush, the bush having an even toothing on the inside and on the outside. For the fine setting of the rotational position, this arrangement allows angular adjustment between the bush toothing and the shaft toothing and the possibilities of angular adjustment between the bush toothing and the hub toothing being in a non-integral ratio to one another.

The devices described above are designed for manual connection of the rods and cannot be used in the case of automated assembly which is becoming increasingly more frequent, since the joining of the individual connecting elements can take place in a multiplicity of setting positions.

An object of the invention is to provide a device and a method for the equiaxial connection of multiple-part linkages, with the final joining allowed to take place only in precisely one setting position, such that use in automated assembly is possible.

This and other objects are achieved by the present invention which provides a device for equiaxial connection of multiple-part steering linkages of vehicles, with precise setting of rotational positions of rods of the steering linkages. The device comprises a coupling, mounted between the rods, this coupling having first and second flanges, each said flange respectively firmly surrounding one end of one of the rods, the end of at least one rod having an even, fine surface toothing. The device also has a bush having an inside contour that is a serration and which surrounds the end of one of the rods, the rod end having a surface toothing. A first of the flanges of the coupling has an inside contour and grips around the bush in an interlocking manner, and the bush has an outside contour with at least one axially parallel contact surface that engages in a corresponding profile of the inside contour of the flange.

The bush can be fitted separately onto the end of the rod provided with a serration, taking into account a defined angular position, in which case the contact surface of the outside contour of the bush must be in a predetermined position in order to allow the coupling flange to be slipped on subsequently.

In certain embodiments of the invention, the contact surface of the outside contour of the bush is a profile with two flat sides and two curved ends. In an advantageous embodiment, the flanges of the coupling are clamping sleeves, and the bush is a clamping bush provided with a slot.

In order to achieve a connection, which is fixed against rotation, of the coupling with the other end of the rod as well, in a further configuration, the second rod has at least one notching in which the second flange of the coupling engages with at least one groove.

The objects are also met by an embodiment of the invention which provides a method for the equiaxial connection of a multiple-part steering linkage of a vehicle, the steering linkage having rods, using a device that has a coupling with a central coupling piece and first and second flanges, and a bush. The method comprises fitting the bush, which has a serration, onto a first end of a first one of the rods such that a contact surface of the bush is in a defined alignment. The coupling, having a first flange with a profile, is slipped onto a first end of a second one of the rods up to a stop such that the first flange of the coupling is positioned on the first end of the second rod and the profile of the first flange is in a predetermined position. The first and second rods are moved axially into a construction position in which the first ends of the first and second rods are located opposite one another and are spaced apart from one another substantially by the width of the central coupling piece. The coupling is pushed in towards the first end of the first rod until the second flange has reached a predetermined position above the bush. The second flange is then firmly connected to the bush and to the first rod.

Other objects, advantages and novel features of the present invention will become apparent from the following detailed description of the invention when considered in conjunction with the accompanying drawings.

DETAILED DESCRIPTION OF THE DRAWINGS

Figure 1:
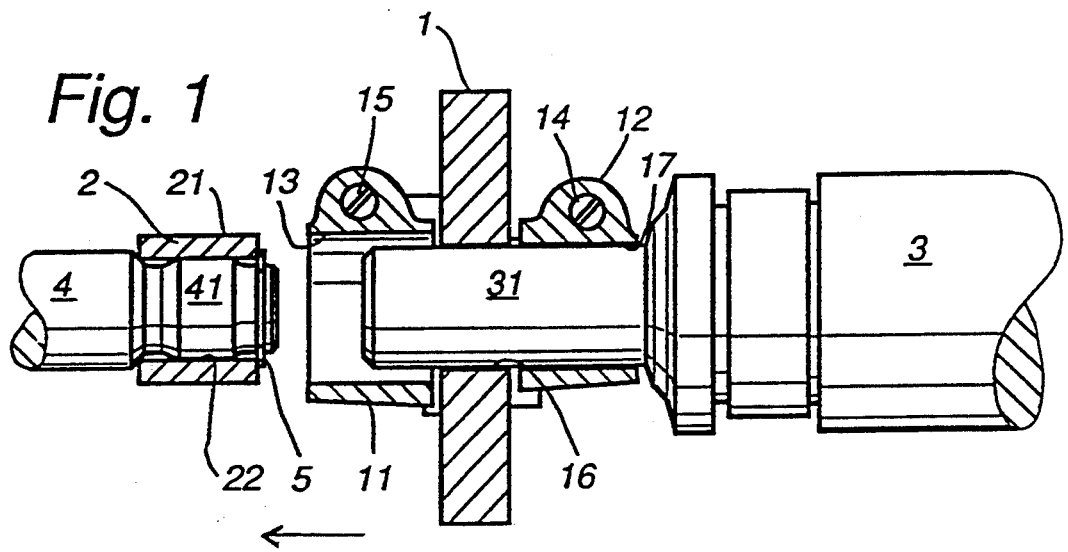
FIG. 1 shows a diagrammatic longitudinal section through an equiaxial linkage having a device constructed according to an embodiment of the present invention, prior to connection.
Figure 2:
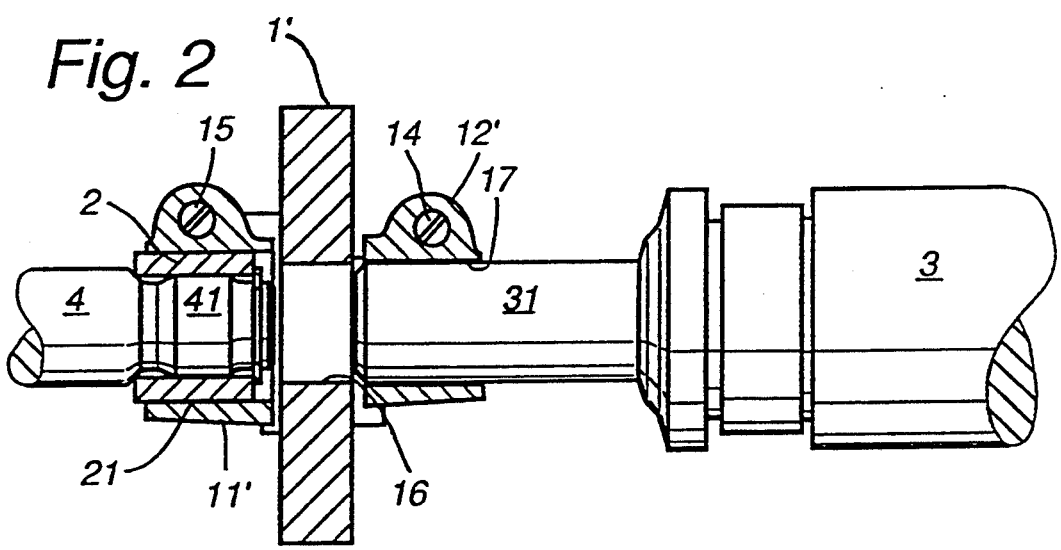
FIG. 2 shows a longitudinal section according to FIG. 1, but after connection of the linkage.

The sequence of FIGS. 1 and 2 illustrates, by the example of a steering linkage, an embodiment of the method according to the present invention for the equiaxial connection of multiple-part linkages using a device according to the invention. This device comprises a steering coupling 1, 11, 12, that has a coupling central piece 1 with flanges that are formed by clamping sleeves 11, 12, and a bush 2. The steering linkage comprises a steering column 3 and a steering gear shaft 4 which are to be connected to one another equiaxially via the ends, namely via a lower steering spindle 31 and a steering worm 41.

For this purpose, the bush 2, whose inside contour has a serration 22, is fitted onto a corresponding toothing of the steering worm 41 and is secured by a securing element 5 from slipping down (see FIG. 1). The steering coupling 11, 12 is slipped onto the lower steering spindle 31 of the steering column 3, the bores 16, 17 of the coupling central piece 1 and of the clamping sleeve 12 corresponding precisely to the steering spindle 31 in diameter and size. Subsequently, the steering column 3 and the steering gear shaft 4 are brought axially into a construction position with short spacing from one another. Their spacing corresponds approximately to the depth of the coupling central piece 1. The steering coupling 1, 11, 12 is then pushed in the direction of the arrow into the position 1', 11' 12' illustrated in FIG. 2, so that the clamping sleeve 11' surrounds the bush 2. By tightening the clamping screws 14, 15, firm connections are produced between the clamping sleeve 12' and the steering spindle 31 and between the clamping sleeve 11' and the bush 2.

In order to be able to undertake precise setting of the rotational position between the steering gear shaft 4 and the steering column 3, the bush 2 has an outside contour which is constructed as a profile 21 that has two flat sides and two curved ends. The interlocking fitting of the bush 2 onto the steering worm 41 takes place in the central position of the steering gear such that the profile 21 of the bush 2 assumes a predetermined position. This predetermined position of the profile 21 depends on the design and position of the clamping sleeve 11 whose inside contour has a profile 13 corresponding to the outside contour of the bush 2. The displacing of the coupling central piece 1 with the clamping sleeve 11 into the position 1', 11' according to FIG. 2 can only take place if the profile 21 of the bush 2 has the same alignment as the profile 13 of the clamping sleeve 11. This unambiguous association allows the device to be used without problems in automated assembly. By tightening the clamping screw 15, a connection which is fixed against rotation is produced between the clamping sleeve 11' and the bush 2. The steering spindle 31 advantageously has at least one notching or profiling (not visible in the drawing) in which the inside contour 17 of the clamping sleeve 12 engages precisely to produce a connection which is fixed against rotation by tightening the clamping screw 14.

Figure 3:
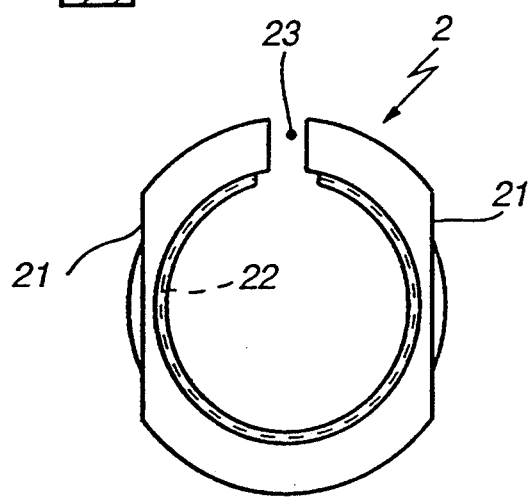
FIG. 3 shows a component of the device constructed according to an embodiment of the present invention in a plan view.

FIG. 3 shows a plan view of the bush 2 whose inside diameter is provided with a serration 22 and whose outside contour has a profile 21 with two flat sides and two curved ends. The slot 23, extending over the entire length of the bush, guarantees that, by tightening the clamping screw, the bush 2 is connected to the steering worm 41 without play.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Device for equiaxial connection of multiple-part steering linkages of vehicles, with precise setting of rotational positions of rods of the steering linkages, comprising:

a coupling, mounted between the rods, said coupling having first and second flanges, rotational positions of the flanges with respect to one another being fixed, each said flange firmly surrounding a respective end of said rods, the end of at least one rod having an even, fine surface toothing, and a bush having an inside contour that is serrated and which surrounds the end of one of said rods, said end of said one rod having the surface toothing, wherein the first flange of the coupling has an inside contour and grips around the bush in an interlocking manner, and wherein the bush has an outside contour with at least one axially parallel contact surface that engages in a corresponding profile of the inside contour of the first flange.

2. Device according to claim 1, wherein contact surface is a profile with two flat sides and two curved ends.

3. Device according to claim 1, wherein the flanges are clamping sleeves.

4. Device according to claim 1, wherein the bush has a slot that extends over the entire length of the bush.

5. Device according to claim 1, wherein at least one of said rods has at least one notching and at least one of the flanges has an inside contour that engages with the at least one notching.

6. Method for the equiaxial connection of multiple-part steering linkage of a vehicle, the steering linkage having rods, using a device that has a coupling with a central coupling piece and first and second flanges that have rotational positions that are fixed with respect to one another, and a bush, the method comprising the steps of:

fitting the bush, which has a serration, onto a first end of a first one of the rods such that a contact surface of the bush is in a defined alignment;

slipping the first and second flanges of the coupling onto a first end of a second one of the rods up to stop such that the first flange of the coupling is positioned the first end of the second rod and a first profile of the first flange is in a predetermined position;

moving the first and second rods axially into a construction position in which the first ends of the first and second rods are located opposite one another and are spaced apart from one another substantially by the width of the central coupling piece;

pushing the coupling in towards the first end of the first rod until the first flange has reached a predetermined position above the bush;

firmly connecting the first flange to the bush and to the first rod; and firmly connecting the second flange to the second rod.

7. Method according to claim 6, wherein the fitting of the bush on the first end of the first rod is performed such that a profile of the bush is in a defined axial direction, and wherein the slipping of the first and second flanges of the coupling onto the first end of the second rod is performed such that the first flange, which has the first profile with two flat sides and two curved ends, comes to rest at the first end of said second rod and the first profile assumes a predetermined position.

* * * * *